Figure 1:
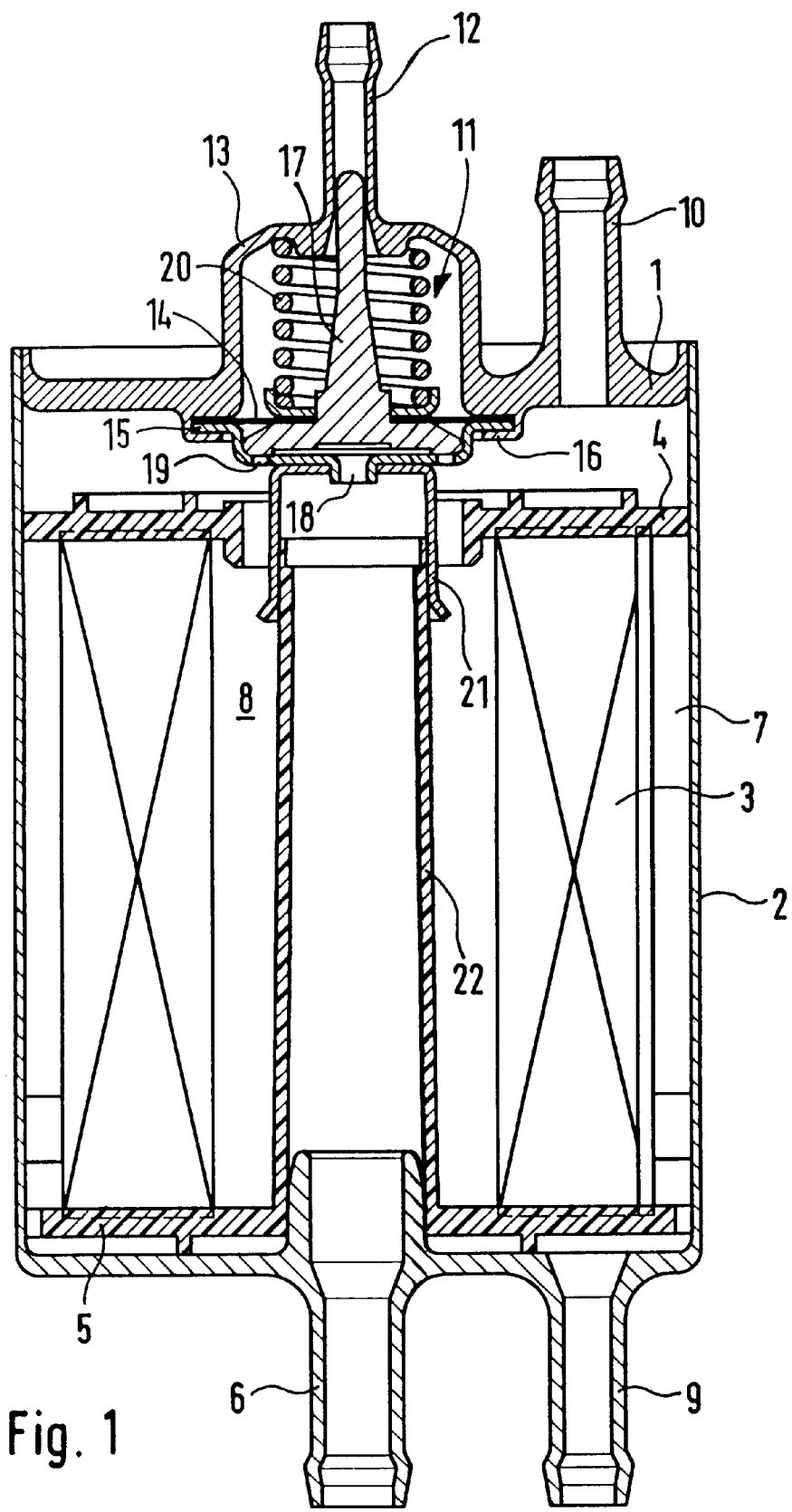

United States Patent [19]
Jauss et al.

[11] Patent Number: 5,989,413
[45] Date of Patent: Nov. 23, 1999

[54] FUEL FILTER WITH AN INTEGRATED PRESSURE REGULATING VALVE

[75] Inventors: Stefan Jauss, Eislingen; Fritz Vogt, Stuttgart; Lothar Mauz, Esslingen; Adolf Triffterer, Wendlingen; Walter Schiffer, Liederbach; Jürgen Schrepfer, Hünstetten, all of Germany

[73] Assignees: DaimlerChrysler AG; Knecht Filterwerke, both of Stuttgart, Germany

[21] Appl. No.: 08/981,281

[22] PCT Filed: Jun. 11, 1996

[86] PCT No.: PCT/DE96/01064

§ 371 Date: Dec. 29, 1997

§ 102(e) Date: Dec. 29, 1997

[87] PCT Pub. No.: WO97/01705

PCT Pub. Date: Jan. 16, 1997

[30] Foreign Application Priority Data

Jun. 29, 1995 [DE] Germany ............... 195 23 626

[51] Int. Cl.⁶ .................................................. B01D 29/88
[52] U.S. Cl. .................... 210/109; 210/116; 210/137; 210/196; 210/416.4; 210/429; 210/439; 210/446
[58] Field of Search ................. 210/168, 171, 210/446, 438, 439, 97, 137, 194, 109, 116, 122, 196, 429, 428, 416.4

[56] References Cited

U.S. PATENT DOCUMENTS

| | | |
|---|---|---|
| 4,387,691 | 6/1983 | Marcoux et al. . |
| 4,427,542 | 1/1984 | Glover . |
| 4,513,725 | 4/1985 | Minami et al. ................ 123/511 |
| 4,539,960 | 9/1985 | Cowles . |
| 4,825,835 | 5/1989 | Deweerdt . |
| 4,996,963 | 3/1991 | Fehrenbach et al. . |
| 5,076,320 | 12/1991 | Robinson . |
| 5,078,167 | 1/1992 | Brandt . |
| 5,149,433 | 9/1992 | Lien . |
| 5,195,494 | 3/1993 | Tuckey ................................ 123/514 |
| 5,375,578 | 12/1994 | Kato et al. ......................... 123/516 |
| 5,413,077 | 5/1995 | Hornby . |

FOREIGN PATENT DOCUMENTS

| | | |
|---|---|---|
| 2157421 | 3/1996 | Canada . |
| 0702142 | 3/1996 | European Pat. Off. . |
| 3446325 | 6/1986 | Germany . |
| 9414297 | 12/1994 | Germany . |
| 4430852 | 4/1995 | Germany . |
| 5-79418 | 3/1993 | Japan . |

Primary Examiner—W. L. Walker
Assistant Examiner—Michael Fleming
Attorney, Agent, or Firm—Collard & Roe, P.C.

[57] ABSTRACT

A fuel filter with a pressure regulating valve for fuel circulated from a fuel tank and injected into an internal combustion engine. The fuel filter comprises a filter pot closed by a cover and an annular filter element for radially filtering flow from the outside in. Fuel flows in and out through main flow connections on opposite sides of the filter. There is a recirculation connection to recirculate fuel. There is a pressure regulating valve on one end of the filter housing with the discharge connection. The pressure regulating valve operates against atmospheric pressure and has a spring-loaded diaphragm which acts in conjunction with a closure ram to close the inlet port of a recirculation flow duct which passes through the center of the filter and connects the regulating valve to the return connection. The diaphragm is fastened with the valve seat in a sealed manner to the edge of the pressure regulator housing, which open into the filter port and is formed in the cover of the filter housing. The return connection passes in a radially sealed manner through the center of an associated end disk of the filter element. The feed connection and the return connection are provided in a second end of the filter and the pressure regulating valve is connected to the return connection via a plug-in connection.

7 Claims, 2 Drawing Sheets

FUEL FILTER WITH AN INTEGRATED PRESSURE REGULATING VALVE

The invention relates to fuel filters, each with an integrated pressure regulating valve as claimed in the preambles of patent claims 9, 14 and 15.

Fuel circulated from a fuel tank here means that the fuel is conveyed, by means of a pump, out of a fuel tank to the fuel injection locations, in each case more fuel being conveyed than injected. The excess fuel conveyed is returned to the tank. The pressure regulating valve of the generic type is provided in the circulation line and is intended to ensure a uniformly high pressure at the injection locations.

DE 44 30 852 U1 has disclosed a fuel filter with a pressure regulating valve, which comprises a filter pot which can be closed by a cover and has an annular filter element provided in it, through which flow takes place from the outside, radially, to the inside, radially, in which filter fuel flows in and out through main-flow connections provided on opposite end sides of the filter. Furthermore, in this device a recirculation connection, which is arranged centrally, is provided for the fuel to be recirculated. Furthermore, the pressure regulating valve is integrated in an end-wall region of the filter housing and is arranged in the axis of the filter, where it is acted on by the cleaned fuel.

DE 34 46 325 A1 has disclosed a fuel feed system with a pressure regulating valve which operates against atmospheric pressure, in which system the pressure regulating valve is not integrated in the housing of the fuel filter. This design is expensive to produce and has a multiplicity of components which are to be connected together using lines which are in some cases very long.

A fuel filter having the generic features of claims 9 and 15 is known from EP 0 702 142, and a fuel filter of this type having the generic features of claim 14 is known from DE 94 14 297.

Against this background, the invention concerns itself with the problem of providing fuel filters of the generic type with an integrated pressure regulating valve which operates against atmospheric pressure and has a structurally simple and economically producible design.

The characterizing features of patent claims 9, 14 and 15 provide advantageous solutions to this common problem. Expedient configurations of the teaching of claim 9 form the subject matter of claims 10 to 13. The characterizing features of claims 12 and 13 simultaneously form advantageous configurations of the fuel filters having the generic features of claim 14 and/or claim 15.

Figure 2:
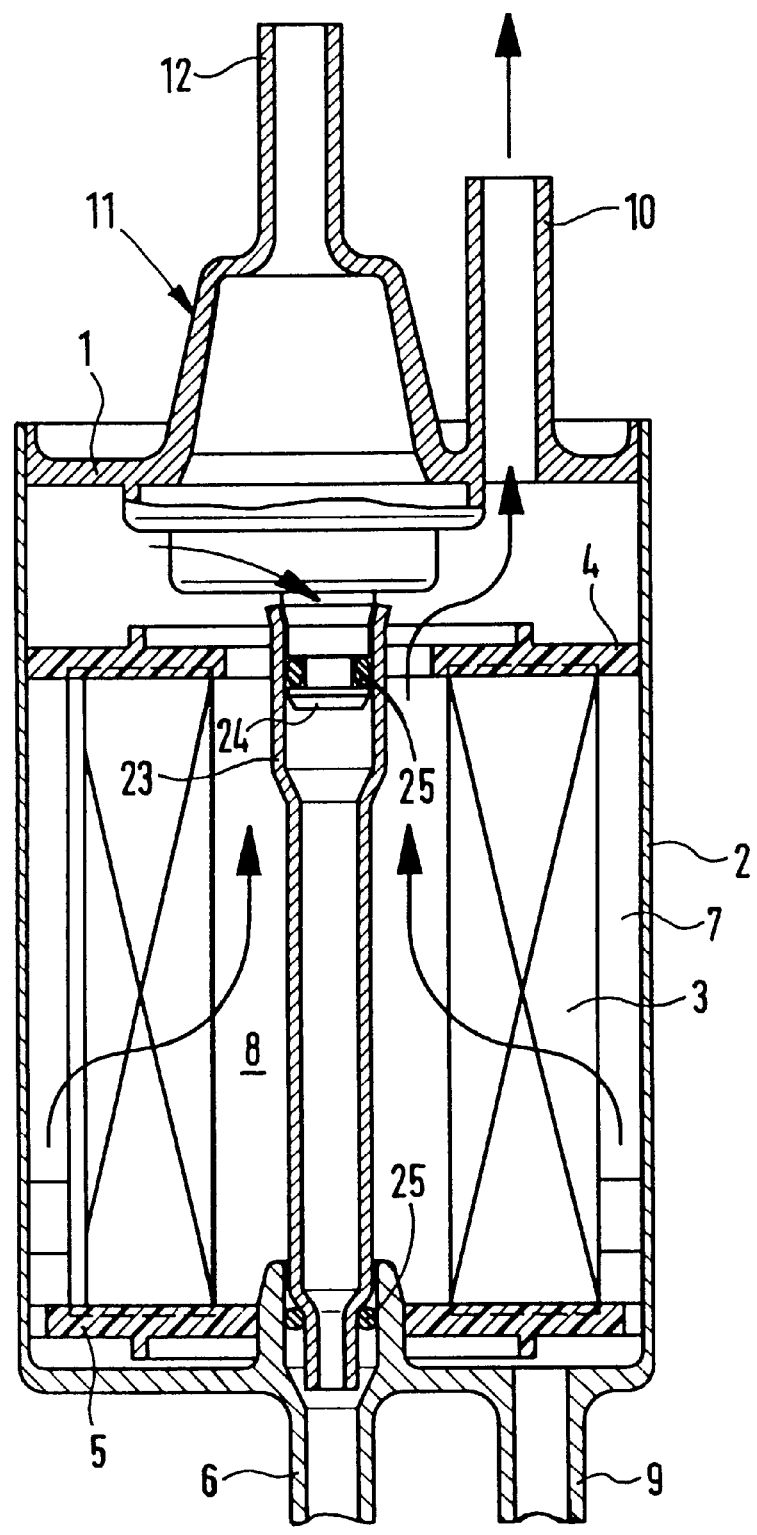

Exemplary embodiments of the invention explained below are illustrated in the drawing, in which:

FIG. 1 shows a longitudinal section through a fuel filter with integrated pressure regulating valve, FIG. 2 shows an alternative design of the fuel filter, illustrated as in FIG. 1.

A fuel filter is designed as a filter pot 2 which is closed by a cover 1. In the filter pot 2 is situated an annular filter element 3, which is arranged coaxially and through which fuel flows from the outside to the inside. To form a crude and a clean chamber inside the filter, the annular filter element 3 is covered at its axial ends with impermeable, annular end disks 4 and 5. By means of the end disk 5 which is situated at the bottom in the drawing, the filter element 3 bears in a radially sealed manner against a connection 6 which protrudes from the housing into the interior of the filter pot 2. A space through which flow can take place remains radially on the outside between the end disk 5 and the housing of the filter pot 2.

The end disk 4 which is situated at the top in the drawing is sealed radially on the outside with respect to the wall of the filter pot 2. As a result, a chamber, which adjoins the annular filter element 3 radially on the outside, inside the filter pot 2 is separated as a crude chamber 7 from a clean chamber 8 situated centrally inside the annular filter element 3. A feed connection 9, which opens out at the lower end side of the filter pot and through which fuel flows into the filter, leads into the crude chamber 7.

A discharge connection 10, which is situated at that end side of the filter which is at the top in the drawing, in the cover 1, guides the filtered fuel to the injection locations of the internal combustion engine.

In addition, a pressure regulating valve 11 is situated in the filter cover 1. This valve operates with atmospheric pressure as reference pressure with respect to the fuel pressure in the interior of the filter pot 2. In order to be able to take the reference pressure, the pressure regulating valve 11 has an open vent connection 12 leading to the atmosphere. This connection 12 may be connected to a tank, which is under atmospheric pressure, of the internal combustion engine.

In detail, the pressure regulating valve 11 is designed as follows.

A bell-shaped housing 13, which is open towards the interior of the filter, for the pressure regulating valve 11 is formed integrally in the axial center of the cover 1 of the filter housing. A diaphragm 14, together with a valve disk 15, is fastened in a sealed manner to that edge of this housing 13 which merges into the interior of the filter. The sealed fastening is achieved by flanging on a flange web 16 provided on the filter cover 1. The diaphragm 14 bears centrally against a ram 17, a shank of which penetrates into the vent connection 12, where it is mounted such that it can be displaced in the longitudinal direction of this connection. Radially on the inside of the connection 12, the shank of the ram 17 has a clearance which is sufficient to provide venting. At the opposite end to the shank, the ram 17 is designed as a closure element for an outflow port 18 of the pressure regulating valve 11. The port 18 is formed by the valve disk 15, which, in its region between the outflow port 18 and its radially outer fastening to the filter cover 1, has through-flow ports 19 for applying the pressure of the fuel present in the clean chamber of the filter to the diaphragm 14. The ram 17 is loaded with a closing force by means of a compression spring 20. A holding connection 21, which projects into the center of the annular filter element 3, is attached to the valve disk 15, so as to surround the outflow port 18.

A pipe 22, as a flow duct, is formed integrally, at a distance from the filter material of the annular filter element 3, centrally inside that end disk 5 of the annular filter element 3 which lies inside the filter at the other end from the pressure regulating valve 11. The material forming the end disk 5 with the integrally formed pipe 22 is a plastic material. The pipe 22 is connected to the outflow port 18 of the pressure regulating valve 11 via the holding connection 21, into which it can be slid in a sealed manner. As a result, fuel which is to be recirculated via the pressure regulating valve 11 can flow back into the fuel tank, via the pipe 22 and through the connection 6.

In the filter design according to FIG. 2, in which the pressure regulating valve 11 is only shown diagrammatically, a separate connecting pipe 23 is employed instead of the pipe 22 which is integrally connected to an end disk 5 of the filter element 3. This connecting pipe 23 can, on the one hand, be plugged into the return connection 6 and, on the other hand, can be plugged onto a connection 24 of the pressure regulating valve 11, in each case in a sealed manner. Sealing rings 25 can be used to ensure that the relevant plug connections are sealed.

When mounting the fuel filter according to the invention, the individual parts, such as for example the annular filter element 3, the filter pot 2 and the filter cover 1, merely have to be inserted into one another. This then also results in the plug connection between the holding connection 21, with the outflow port 18 of the pressure regulating valve 11, and the flow duct, which in the embodiment in accordance with FIG. 1 is designed as a pipe 22 and which leads to the return connection 6. The same applies to the embodiment in accordance with FIG. 2 with a separate connecting pipe 23.

Apart from the connection between the filter cover 1 and the filter pot 2, the plug connections are already sealed, without the need for further auxiliary measures. Only this latter connection requires additional auxiliary measures in order to be closed in a force-fitting and sealed fashion in a manner known per se.

The pressure regulating valve 11 integrated in the cover 1 of the filter can easily be incorporated in this cover. Having been prefabricated in this way, the filter cover 1 can be connected to the filter pot 2.

We claim:

1. Fuel filter with a pressure regulating valve (11) for fuel which is circulated from a fuel tank and is to be injected into an internal combustion engine at constant pressure for combustion, which fuel filter comprises a filter pot (2), which can be closed by a cover (1) and in which there is provided an annular filter element (3) through which flow takes place from the outside, radially, to the inside, radially, in which fuel flows in and out through main-flow connections (9, 10) which are provided on opposite end sides of the filter, a recirculation connection (6) is provided for the fuel to be recirculated, the pressure regulating valve (11) is situated, in the region of the axis of the filter, in a first end-wall region of the filter housing, together with the discharge connection (10), and is acted on by the cleaned fuel, the pressure regulating valve (11) operates against atmospheric pressure as the reference pressure and has a diaphragm (14) which is spring-loaded from the atmosphere side and, in conjunction with a closure ram (17), serves as a closure means for the inlet port of a recirculation flow duct (22, 23) which passes through the center of the filter, the recirculation flow duct (22, 23) connects that region of the pressure regulating valve (11) which allows the return of fuel to the return connection (6), which passes in a radially sealed manner through the center of an associated end disk (5) of the annular filter element (3), the pressure regulating valve (11) has a valve seat (15) to support the closure ram (17), the valve seat (15) being provided with a central port (18) and through-flow ports (19) radially outside this central port (18), in order for fuel to act on the diaphragm (14), the feed connection (9) and the return connection (6) are provided together in the second end-wall region of the filter, with the return connection arranged centrally, that region of the pressure regulating valve (11) which allows the return of fuel is connected to the return connection (6) via a plug-in connection, characterized in that the diaphragm (14), which is spring-loaded from the atmosphere side, together with the valve seat (15), is fastened in a sealed manner to the edge of a bell-shaped pressure regulator housing (13), which opens into the filter pot (2) and is formed in the cover (1) of the filter housing.

2. Fuel filter according to claim 1, characterized in that the diaphragm (14), together with the valve seat (15), is flanged in at that edge of the pressure regulating valve housing (13) which opens into the interior of the filter pot (2).

3. Fuel filter according to claim 1, characterized in that a connection (21), which is aligned coaxially with respect to the axis of the annular filter and opens into the interior of the annular filter, of the pressure regulating valve (11) is connected in a sealed manner to the valve seat (15).

4. Fuel filter according to claim 1, characterized in that the return flow duct is a pipe (22) which starts from an end disk, which bears in a sealed manner against the return connection (6), of the filter element (3) and is integral with this end disk.

5. Fuel filter according to claim 1, characterized in that that region of the pressure regulating valve (11) which allows the return of fuel is connected to the return connection (6) via a return flow duct, which is designed as a pipeline (23), which can be plugged into the connecting locations of the pressure regulating valve (11), on the one hand, and of the return connection (6), on the other hand, in each case in a sealed manner.

6. A fuel filter with a pressure regulating valve (11) for fuel which is circulated from a fuel tank and is to be injected into an internal combustion engine at constant pressure for combustion, which fuel filter comprises a filter pot (2), which can be closed by a cover (1) and in which there is provided a filter element (3) through which flow takes place from the outside, radially, to the inside, radially, in which filter fuel flows in and out through main-flow connections (9, 10) which are provided on opposite end sides of the filter, in which filter furthermore a recirculation connection (6) is provided for the fuel to be recirculated, and in which filter, in addition, the pressure regulating valve (11) is arranged in an end-wall region of the housing in the axis of the filter, and in which filter, furthermore, the return connection (6) passes through the center of an associated end disk (5) of the filter element in a radially sealed manner,
wherein the pressure regulating valve (11) operates against atmospheric pressure as reference pressure, the pressure regulating valve (11) is integrated, together with the discharge connection (10), in a first end-wall region of the filter and is acted on by the cleaned fuel, the feed connection (9) and the return connection (6) are provided together in the second end-wall region of the filter, with the return connection (6) arranged centrally, that region of the pressure regulating valve (11) which permits the return of fuel is connected to the return connection (6) via a return flow duct (23) which passes through the center of the filter, the return flow duct (23) is a pipeline, which is connected, by means of a plug connection, to the return connection (6) and the pressure regulating valve (11).

7. A fuel filter with a pressure regulating valve (11) for fuel which is circulated from a fuel tank and is to be injected into an internal combustion engine at constant pressure for combustion, which fuel filter comprises a filter pot (2), which can be closed by a cover (1) and in which there is provided an annular filter element (3) through which flow takes place from the outside, radially, to the inside, radially, in which filter fuel flows in and out through main-flow connections (9, 10) which are provided on opposite end sides of the filter, in which filter furthermore a recirculation connection (6) is provided for the fuel to be recirculated, and in which filter, in addition, the pressure regulating valve (11) is arranged in an end-wall region of the filter housing in the axis of the filter, and in which, furthermore,

- the pressure regulating valve (11) operates against atmospheric pressure as reference pressure,
- the pressure regulating valve (11) is integrated, together with the discharge connection (10), in a first end-wall region of the filter and is acted on by the cleaned fuel,
- the feed connection (9) and the return connection (6) are provided together in the second end-wall region of the filter, with the return connection (6) arranged centrally, that region of the pressure regulating valve (11) which permits the return of fuel is connected to the return connection (6) via a return flow duct which passes through the center of the filter, wherein

- the return connection (6) passes through the center of an associated end disk (5) of the filter element in a radially sealed manner,
- the return flow duct is a pipe (22) which starts from that end disk of the filter element which bears in a sealed manner against the return connection (6), and is integral with this end disk.

* * * * *